Sept. 1, 1959     J. R. CHIVERS     2,901,965
TOASTER APPARATUS
Filed March 25, 1957     3 Sheets-Sheet 1
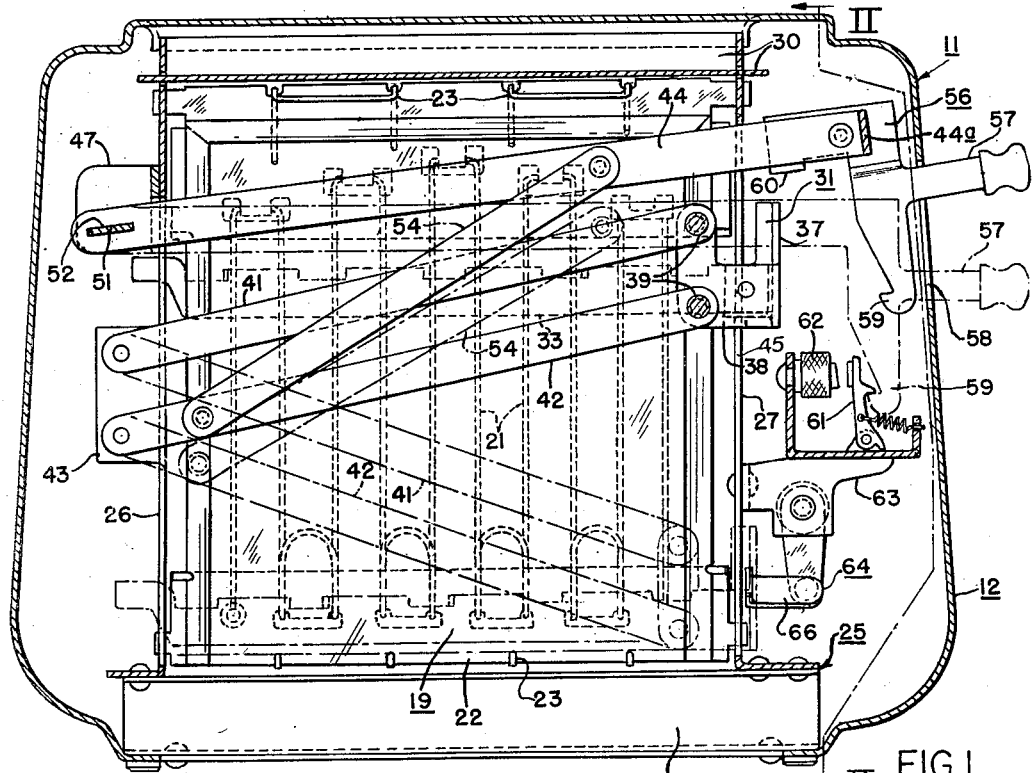
FIG.1.
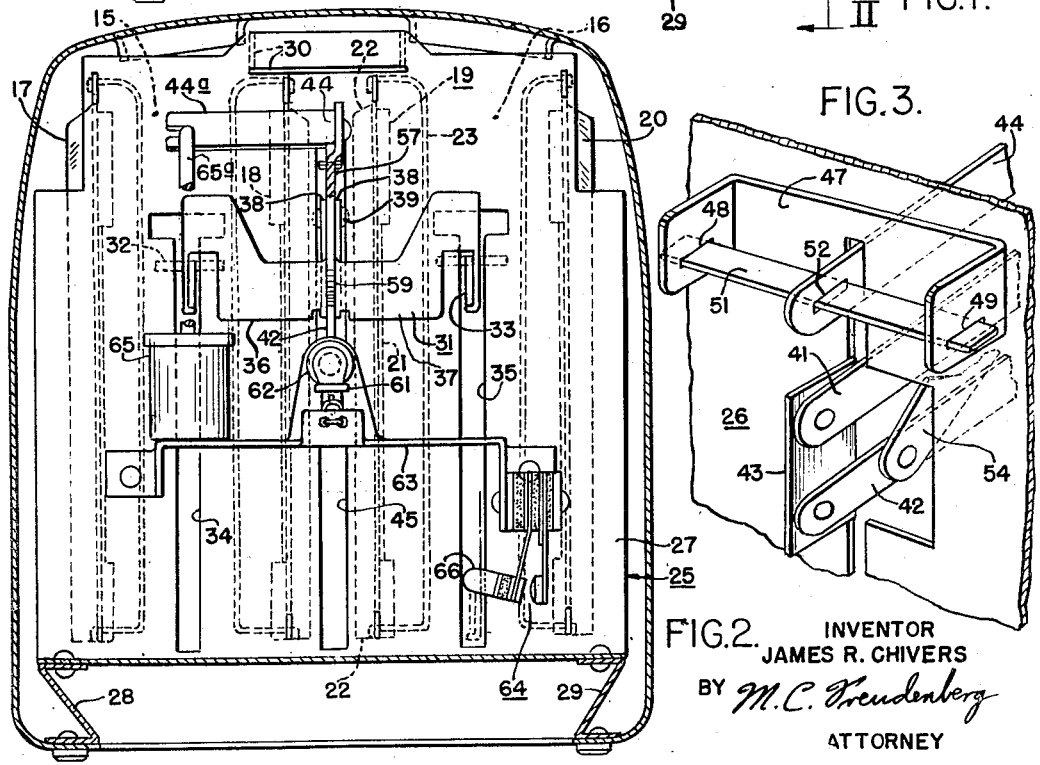
FIG.2.
FIG.3.
INVENTOR
JAMES R. CHIVERS
BY M. C. Freudenberg
ATTORNEY INVENTOR
JAMES R. CHIVERS
BY M. C. Freudenberg
ATTORNEY Sept. 1, 1959   J. R. CHIVERS   2,901,965
TOASTER APPARATUS
Filed March 25, 1957   3 Sheets-Sheet 3

INVENTOR
JAMES R. CHIVERS
BY M. C. Freudenberg
ATTORNEY

United States Patent Office 2,901,965
Patented Sept. 1, 1959

2,901,965

TOASTER APPARATUS

James R. Chivers, Mansfield, Ohio, assignor to Westinghouse Electric Corporation, East Pittsburgh, Pa., a corporation of Pennsylvania Application March 25, 1957, Serial No. 648,106

7 Claims. (Cl. 99—391)

This invention relates to a pop-up type toaster and particularly to a mechanism for providing the motive force for movement of a bread supporting member between toasting and popped-up or bread receiving positions.

One of the objects of this invention is to simplify the operating mechanism for moving a bread slide between a toasting and an exposed position in a toaster.

Another object of this invention is to provide in a toaster of the above type, an improved low cost operating mechanism for moving and guiding bread supporting members between toasting and bread receiving positions.

Another object of this invention is to provide improved energy storing means for actuating the operating mechanism of a pop-up toaster that is manually operated to initiate a toasting operation.

This invention may be applied to a toaster having a plurality of heating elements defining a pair of generally parallel toasting chambers. In accordance with this invention, a movable carriage having bread supporting bars extending into the toasting chambers is provided with an actuating lever that is biased to an upper bread receiving position by means of a simple torsion bar connected to the lever. The lever may form a part of, or be connected to, a parallel movement mechanism which permits vertical movement of the carriage in response to movement of the operating lever, but prevents any angular movement of the carriage as it moves between bread receiving and bread toasting positions.

The foregoing and other objects are effected by the invention as will be apparent from the following description and claims taken in connection with the accompanying drawings, forming a part of this application, in which:

Fig. 1 is a vertical section taken on the longitudinal center plane of a toaster structure;

Fig. 2 is a vertical section taken on the line II—II of Fig. 1;

Fig. 3 is a perspective showing the torsion bar and fixed ends of levers of the operating mechanism shown in Fig. 1;

Figure 4:
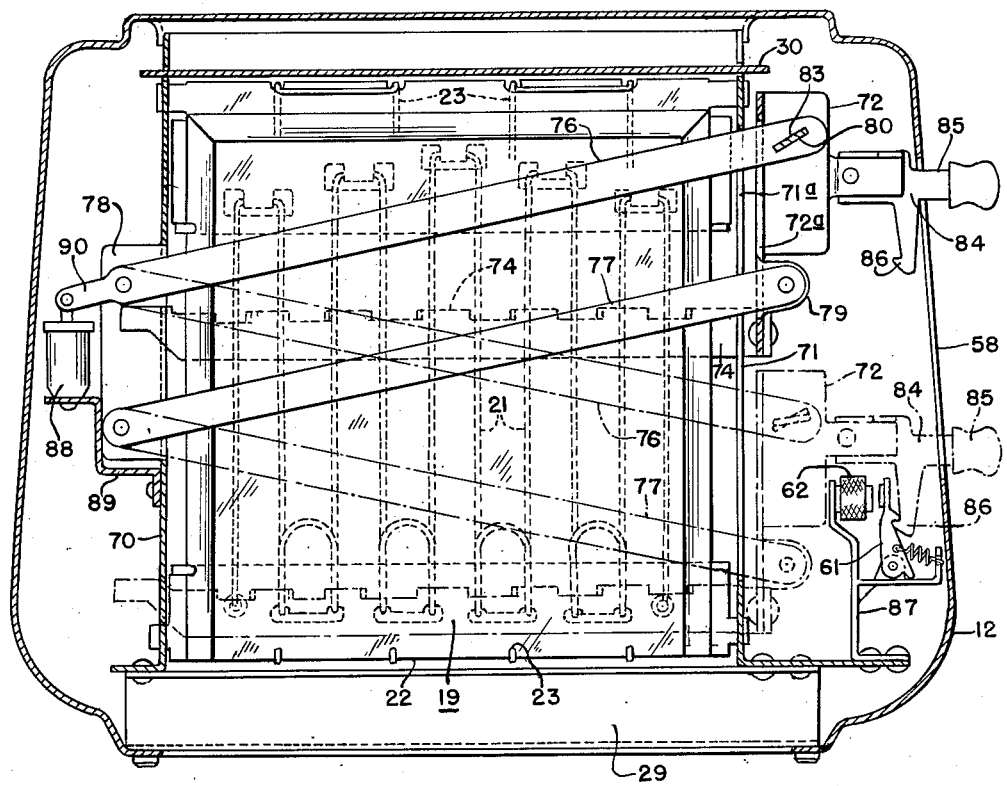
Fig. 4 is a vertical section similar to Fig. 1, but illustrating a second embodiment of the invention.

Referring to the embodiment of the invention shown in Figs. 1 through 3, a toaster 11 comprising a housing 12 fabricated of sheet metal or other suitable material is provided in its top surface with a pair of openings providing access to a pair of toasting chambers 15 and 16.

Supported within the housing and helping to define the toasting chambers 15 and 16 therein are two pairs of heaters 17, 18 and 19, 20, respectively. The heaters are all identical to heater 19 which comprises a convoluted relatively stiff resistance wire heating element 21 suitably supported in insulated relationship on reflecting plate 22. Guard wires 23 are attached to the reflecting plate 22 and extend along the exposed face of the heating element 21 to prevent direct contact therewith of bread slices in the toasting chambers. Reference numerals for the elements of the heaters have been applied only to the heater 19 in the drawings. The heaters referred to herein may be of the type described and claimed in Palmer et al. Patent 2,778,912, assigned to the assignee of the present invention.

The heaters are supported in the toaster housing 12 by means of a frame 25 comprising a pair of parallel end panels 26 and 27 rigidly attached to a pair of parallel beams 28 and 29 extending longitudinally of the casing at the bottom thereof. The tops of the end panels 26 and 27 are rigidly connected by a channel-shaped bar 30 extending therebetween. The reflecting plate of each of the heaters has a pair of tabs at each end projecting into slots in the end panels 26 and 27 to support the heaters.

A movable carriage structure 31 is disposed adjacent the outer face of the end panel 27 and has attached thereto a pair of bread supporting bars 32 and 33 extending through vertical slots 34 and 35 in the panel 27 and into the toasting chambers 15 and 16, respectively. The bars 32 and 33 extend horizontally within these chambers and each bar provides a surface for engaging and supporting the bottom edge of a bread slice. The carriage structure 31 comprises a pair of sheet metal members 36 and 37 having adjacent end portions 38 projecting through a central vertical slot 45 in the end panel 27. These end portions 38 are secured to the ends of rivets 39 in spaced relation to receive intervening ends of arms 41 and 42 which are pivotally carried by the rivets 39, as best seen in Fig. 1. Further reference to the support of the arms 41 and 42 is made hereinafter. The members 36 and 37 have outer portions connected to the bread supporting bars 32 and 33 and projecting through the slots 34 and 35, respectively.

The bread bars 32 and 33 are maintained horizontally by means of a parallel movement mechanism connected to the carriage structure 31. This mechanism comprises the parallel flat rigid arms 41 and 42 of equal length extending between the center heaters 18 and 19, with one end of each arm pivotally attached to the carriage 31 adjacent the end panel 27. The pivotal attachment of the arms 41 and 42 to the carriage is effected by the rivets 39 that hold the carriage members 36 and 37 together, as set forth above. The latter are held rigid relative each other, but are sufficiently spaced to prevent binding of the ends of the arms 41 and 42 which extend therebetween. The other end of each of the arms 41 and 42 is pivotally supported on a vertical flat sheet-metal projection 43 formed out of the end panel 26.

Extending above the parallel arms 41 and 42 in a vertical plane common thereto is an operating lever 44 having one end pivotally supported adjacent the end panel 26 and its other end extending parallel to the toasting chambers and through the vertical slot 45 in the other end panel 27. The lever 44 is pivotally supported on the end panel 26 by means comprising a U-shaped member 47 having slots 48 and 49 in the opposed sides thereof for receiving a flat blade 51 of heat resistant spring metal forming a torsion bar. This flat blade 51 also extends through a slot 52 in the pivoted or relatively fixed end of the lever 44 to pivotally support the latter. The lever 44 extends through aligned vertical slots in the end panel 26 and in the member 47. The slot 52 in the lever 44 engages the blade 51 approximately mid-way between the sides of the U-shaped member 47. The slots 48 and 49 in the U-shaped member are angularly disposed relative the slot 52 in the end of the lever 44 so that the lever will always be biased counterclockwise or upwardly as seen in Fig. 1. The ends of the blade 51 may be crimped or other suitable means provided to prevent the blade from sliding out of the slots 48 and 49.

A stiff force transferring link 54 is pivotally connected at one end to an intermediate part of the operating lever 44 and its other end is connected to one of the parallel arms, preferably the lower arm 42, adjacent its pivotal connection to projection 43. This connection, of course, provides greater angular movement of the parallel arms than of the operating lever 44.

The movable or actuated end of the operating lever 44 has pivotally attached thereto an actuating member 56 having a handle portion 57 extending outwardly through a vertical slot 58 in the end wall of the toaster housing 12. Depending from the actuating member 56 within the toaster housing is a latch 59 which is engageabe with a detent on a spring biased armature 61 disposed opposite a pole of an electro-magnet 62. The armature 61 and latch 59, when coupled as shown dotted in Fig. 1, serve to hold the actuating member 56 and lever 44 in their lower position so that the carriage 31 and bread supports 32 and 33 are also retained in their lower or toasting positions. Clockwise movement of the actuator 56 relative lever 44 is limited when the actuator is manually depressed by engagement of a stop 60 on the actuator with the underside of the lever 44. The latch 59 may be manually released from the detent on armature 61 by lifting the handle portion 57 to pivot the actuator 56 counterclockwise relative the lever 44. Such action may be used to prematurely terminate a toasting operation.

The electro-magnet 62 and armature 61 are supported on a bracket 63 attached adjacent its ends to the end panel 27 as best shown in Fig. 2. The portion of the bracket 63 intermediate its ends is spaced from the panel 27 to permit movement of the carriage 31 therebetween. The electromagnet 62 may be energized by any suitable condition responsive means in control of the toasting operation to attract the armature and release the operating lever 44 and carriage 31 for movement to their upper positions. A horizontal extension 44a of the operating lever 44 is bent at a right angle thereto and is connected to a movable rod 65a which operates a plunger (not shown) in a dashpot 65. The dashpot may be of conventional construction and retards upward movement of the lever 44 to smooth the travel of the toaster carriage, all of which is well understood.

The toaster heaters 17, 18, 19 and 20 may be connected in any suitable manner in series with a switch 64 which controls their energization from a suitable power source. The switch is supported on the bracket 63 and comprises a movable contact having an actuator 66 in the path of movement of the bread carriage 31. The switch 64 is automatically closed to energize the toaster heaters when the carriage 31 engages the actuator 66 as it is lowered to its toasting position.

To carry out a toasting operation in the embodiment of the invention illustrated in Figs. 1 through 3, the user will insert bread slices in one or both the toasting chambers 15 and 16 and then manually depress the operating handle 57. The manual depression of the handle moves the actuating lever 44 clockwise and the latter exerts a force through the link 54 on the parallel movement mechanism to cause the bread supporting bars 32 and 33 attached to the carriage to be lowered to a position in which the bread supported thereon will be disposed between the heaters. Clockwise movement of the lever 44 stores additional energy in the torsion blade 51, which, upon release of latch 59 by energization of the electromagnet, effects return movement of the parallel movement mechanism and the actuating lever 44 to the upper positions. The actuating member may be manually rotated counterclockwise, as seen in Fig. 1, relative the lever 44 to separate the latch 59 from the armature 60 to interrupt a toasting operation before the electromagnet 62 is energized.

The upward movement of the operating lever 44 is limited by its engagement with the panel 27 at upper end of the slot 45. During assembly of the lever and torsion bar 51, the latter is stressed so that the lever 44 will always move to its uppermost position at the end of a toasting operation.

Figure 5:
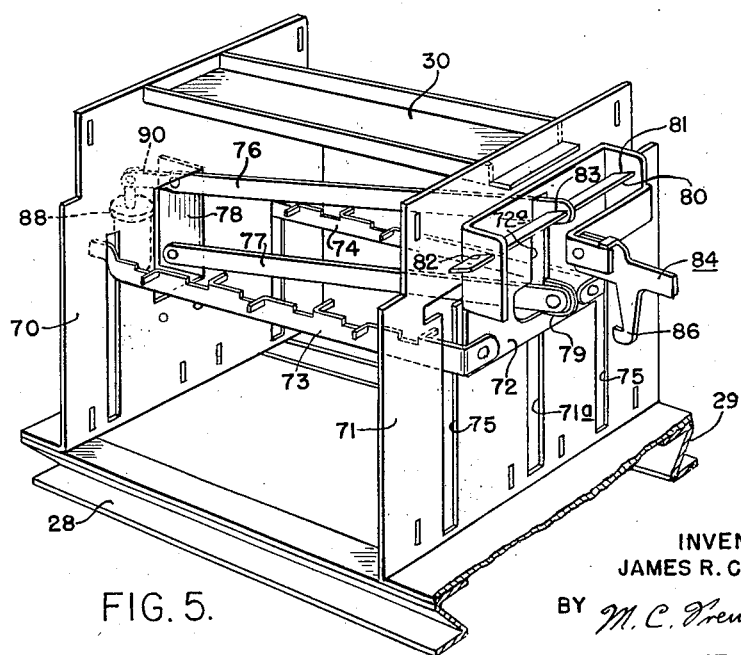
Fig. 5 is a perspective of the operating mechanism of Fig. 4 removed from the toaster housing, without the toaster heaters and with the carriage latching mechanism partially cut away.

Referring to the embodiment of the invention shown in Figs. 4 and 5, the casing 12, supporting beams 28 and 29 and channel member 30 are identical to those in Figs. 1 through 3. Although only one heater 19 is shown in Fig. 4, it is contemplated that four heaters, identical to heaters 17, 18, 19 and 20 of the first embodiment, would also be used with this embodiment, to define parallel toasting chambers. These heaters may be disposed in this same arrangement as indicated in Fig. 2 and supported by end panels 70 and 71 similar to the end panels 26 and 27 of the earlier embodiment. Adjacent the outer face of the end panel 71 is a vertically movable carriage 72 having attached thereof a pair of bread supporting bars 73 and 74 disposed for movement in parallel toasting chambers in the same manner as in the earlier embodiment. These bars 73 and 74 extend through vertical slots 75 in the end panel 71. The carriage 72 is supported by a parallel movement mechanism comprising two parallel arms 76 and 77. Each of the arms has one end pivotally connected to a fixed projection 78 on the end panel 70. This projection 78 is preferably formed by bending a portion of the end panel out of the plane thereof until it extends normal to the panel 70 and is generally vertical. The other ends of the parallel arms 76 and 77 extend through vertical slots 71a and 72a in the end panel 71 and carriage 72, respectively, and are pivotally connected to the movable carriage 72. The arm 77 is attached to a tab 79 on the carriage 72, whereas, the other arm 76 is pivotally connected to the carriage by means of a torsion bar 80. The torsion bar is a flat spring blade, the ends of which are anchored in slots 81 and 82 in opposite sides of the carriage 72. A central portion of the torsion bar 80 extends through a slot 83 in the end of the arm 76. The ends of the bar 80 may be crimped or otherwise deformed to prevent them from sliding out of the slots 81 and 82.

Attached to the carriage 72 is an actuating member 84 comprising an operating handle 85 extending outwardly through the slot 58 in the end wall of the toaster housing 12. The handle 85 may be manually depressed to move the carriage 72 and bread bars 73 and 74 from their upper bread receiving positions, as seen in solid lines in Fig. 4, to a lower bread toasting position shown in dot and dash lines. A latch 86 depending from the actuating member 84 is arranged to be engaged by a holding detent on a magnetic armature 61 to retain the carriage 72 in its toasting position, as seen dotted in Fig. 4. The armature is spring biased to its retaining position and may be moved to release the latch by means of an electro-magnet 62 which may be energized by any suitable condition responsive means to terminate a toasting operation. The electro-magnet 61 and armature 62 in Fig. 4 are the same as those in Fig. 1 and are supported by a bracket 87 carried by a horizontally extending bottom flange portion of the end panel 71. A suitable carriage actuated switch (not shown) similar to the switch 64 of the earlier embodiment may be used to automatically deenergize the toaster heater at the end of a toasting operation.

The downward movement of the carriage causes the torsion bar 80 to be stressed by angular movement of arm 76 relative the carriage 72 so that the carriage will be returned to its uppermost position when the latch on the actuating member is released. The upward movement of the carriage by the torsion bar is controlled by a suitable dashpot 88 supported on a bracket 89 on the outer face of the end panel 70. A movable plunger (not shown) in the dashpot 88 is connected to an extension 90 of the upper arm 76 as seen in Fig. 4.

Figure 6:
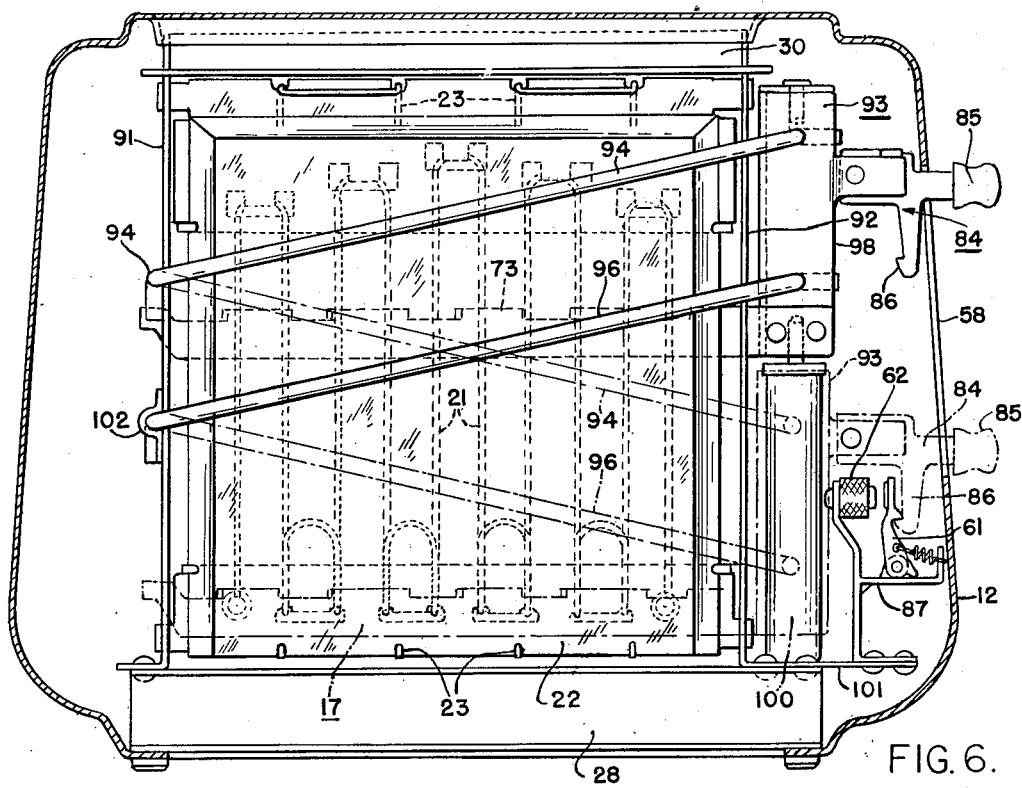
Fig. 6 is a side view of a toaster with a side wall of the casing cut away to illustrate a third embodiment of the invention.
Figure 7:
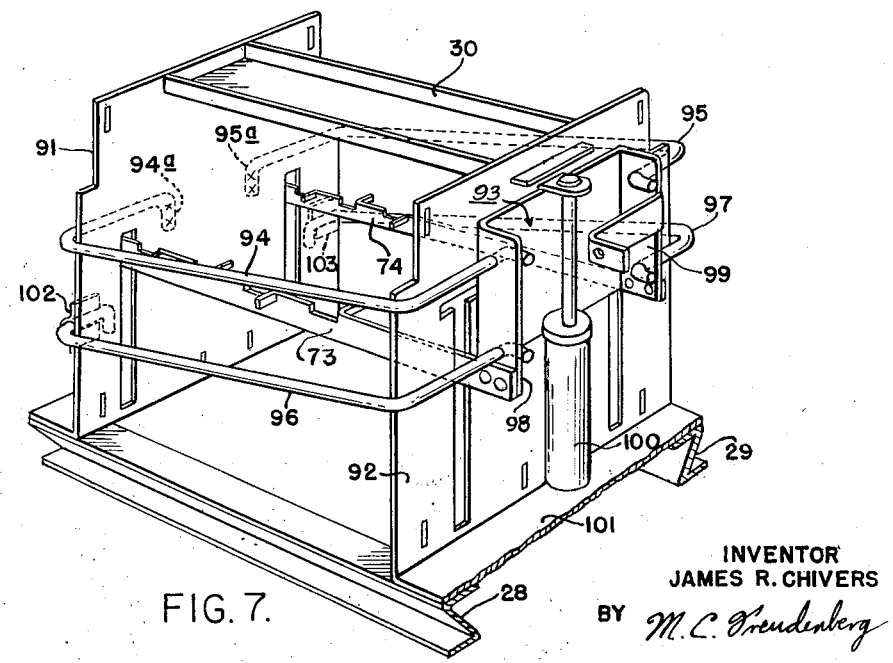
Fig. 7 is a perspective of the operating mechanism of the toaster shown in Fig. 6 without heaters and latching device.

In Figs. 6 and 7 there is shown a third embodiment of the invention in which the toaster casing and the arrangement of heaters may be the same as in the earlier embodiments. The heaters, of which only heater 19 is shown, may be supported in the same manner as described previously between a pair of end panels 91 and 92 connected and supported by a pair of beams 28 and 29 and channel member 30, as before.

At one end of the toaster on the outside of the end panel 92 is a vertically movable carriage 93 having a pair of bread supports 73 and 74 arranged to extend into the toasting chambers defined by the heaters. The carriage 93 is supported for vertical movement by two pairs of resilient wire rods 94, 96 and 95, 97 extending along opposite sides of the toaster. Each of the wire rods is bent in a generally U-shape with the base of the U extending the length of the toasting chambers at the outside of the outer heaters and generally parallel to the plane of each toasting chamber. The ends of these rods are bent to extend horizontally along the end panels 91 and 92. One end of each of the rods 94 and 96 is pivotally attached to a side flange 98 of the carriage. The rods 95 and 97 are similarly attached to another flange 99 at the other side of the carriage. The downwardly turned tips 94a and 95a at the ends of the upper U-shaped members 94 and 95 are anchored as by welding to the outer side of the end panel 91. The portions of rods 94 and 95 extending outwardly from the tips 94a and 95a along the outer face of the end panel 91 may be torsionally stressed by depressing the toaster carriage to bias the latter for return to its upper or bread receiving position. The ends of the lower supporting rods 96 and 97 are pivotally secured to the outer face of the end panel 91 in a suitable manner such as by the straps 102 and 103, respectively. It should be understood, however, that the lower rods 96 and 97 might be made identical to rods 94 and 95 and fastened to the end wall 91 in the same manner.

The carriage is provided with an actuator 84 like that of Fig. 4 comprising a handle 85 extending outwardly through the slot 58 in the end wall of the toaster housing 12. The handle 85 may be manually depressed to move the carriage 93, bread supporting bars 73 and 74 and the wire rods 94 through 97 from their bread receiving positions, indicated by solid lines in Fig. 6, to their bread toasting positions, shown by dot and dash lines. During this movement of the carriage 93, additional stress is imparted to the transversely extending portions of the wire rods 94 and 95 along the end panel 91.

The carriage 93 may be latched in its lower position by means of a latch 86 depending from the actuator 84 and engageable with a detent on a spring biased armature 61. The armature is disposed opposite the pole of an electromagnet 62 which may be energized by any suitable means to attract the armature and release the bread carriage 93 for return to its bread receiving position at the end of a toasting operation. The upward movement of the bread carriage may be dampened or retarded by a suitable dashpot 100 connected between the carriage 93 and a horizontal flange 101 at the bottom of the end panel.

In each of the above embodiments of the invention, the toaster carriage is movable between an upper bread receiving position and a lower bread toasting position. The carriage in each case is biased to its upper position by a simple resilient torsion bar construction. The torsion bar is connected to, or forms a part of, a parallel movement mechanism which actuates and supports the carriage and maintains the bread supporting bars, attached to the latter, generally horizontally at all times. In each instance, the torsion bar is constructed as an inexpensive flat blade or a piece of wire rod extending normal to the plane of movement of the lever to which it is connected. These torsion bars are very economical to manufacture and simple to assemble in apparatus of the type shown herein.

While the invention has been shown in several forms, it will be obvious to those skilled in the art that it is not so limited, but is suspectible of various other changes and modifications without departing from the spirit thereof.

What is claimed is:

1. Electrical toasting apparatus comprising a housing, a plurality of electrical heaters within said housing defining a pair of toasting chambers, a frame for supporting said heaters within said housing, a movable member supported by said frame and having a bread supporting bar extending into each of said chambers, said member being movable between bread receiving and bread toasting positions, a pair of parallel levers having one end of each pivotally connected to said member, the other ends of said levers being pivotally supported by said frame, said levers being movable with said member between bread receiving and bread toasting positions, a torsion bar forming the pivotal connection between one of said levers and said frame, one end of said bar being rigidly connected to said frame, said bar being rigidly connected to said lever at a point spaced from said one end of said bar, said lever maintaining a torsional stress in said bar to bias said lever and the movable member toward their bread receiving positions, means for actuating said movable member against said bias to its toasting position and means for latching said movable member in its toasting position during a toasting operation.

2. Electrical toasting apparatus comprising a housing, a plurality of electrical heaters within said housing defining a pair of toasting chambers, a frame for supporting said heaters within said housing, a movable member supported by said frame and having a bread supporting bar extending into each of said chambers, said member being movable between bread receiving and bread toasting positions, a pair of parallel levers having one end of each pivotally connected to said member, the other ends of said levers being pivotally supported by said frame, said levers being movable with said member between bread receiving and bread toasting positions, a torsion bar forming the pivotal connection between one of said levers and said member, one end of said bar being rigidly connected to said member, said bar being rigidly connected to said lever at a point spaced from said one end of said bar, said lever maintaining a torsional stress in said bar to bias said lever and the movable member toward their bread receiving positions, means for actuating said movable member against said bias to its toasting position and means for latching said movable member in its toasting position during a toasting operation.

3. Toasting apparatus comprising a housing, two pairs of electrical heaters supported in said housing and defining a pair of parallel bread toasting chambers, a frame in said housing supporting said heaters, a movable member at one end of said heaters having a bread supporting bar extending into each of said chambers, a pair of parallel equal length levers having one end of each pivotally connected to said movable member, the other ends of said levers being pivotally supported by said frame adjacent the other end of said heater, a third lever pivotally supported on said frame, the pivotal support for the third lever comprising a resilient torsion bar disposed normal to the plane of said third lever and having a terminal portion secured to said frame and having another portion secured to said third lever in non-rotatable relation thereto, linkage connecting said third lever and one lever of said pairs of levers, said third lever being movable between two positions to move said movable member between its bread receiving and bread tooasting positions, said torsion bar being stressed upon movement of said movable member from its bread receiving position to its bread toasting position to bias said movable member toward its bread receiving position, means for moving said third lever to move said member to its tooasting position and means for holding said member in the latter position during a toasting operation.

4. Toasting apparatus comprising a housing, two pairs of electrical heaters supported in said housing and defining a pair of parallel bread toasting chambers, a frame in said housing supporting said heaters, a movable member at one end of said heaters having a bread supporting bar extending into each of said chambers, a pair of parallel equal length levers having one end of each pivotally connected to said movable member, the other ends of said levers being pivotally supported by said frame adjacent the other end of said heater, a third lever pivotally supported on said frame, the pivotal support for the third lever comprising a resilient torsion bar disposed normal to the plane of said third lever and having a terminal portion secured to said frame in non-rotatable relation thereto and having another portion secured to said third lever in non-rotatable relation thereto, linkage connecting said third lever and one lever of said pair of levers, said third lever being movable between two positions to move said movable member between its bread receiving and bread toasting positions, said torsion bar being stressed upon movement of said movable member from its toast receiving position to urge said movable member toward its bread receiving position, means for moving said third lever to move said member to its toasting position and means for holding said member in the latter position during a toasting operation, said levers extending from one end of said heaters to the other between said toasting chambers, said bar being disposed at the end of said heaters remote from said movable member.

5. A toasting structure including electrical heating means for toasting a bread slice, a bread support movable relative the heating means and between a bread receiving and a bread toasting position, a plurality of levers, a frame pivotally supporting the levers, means pivotally connecting at least a portion of said levers and the bread support and affording movement of the support between the bread receiving and toasting positions, an elongated spring torsion bar disposed normal to one of said levers and having one portion thereof secured to said frame and restrained from rotation about the longitudinal axis of the bar, another portion of the bar being secured to said one lever in non-rotatable relation thereto, said bar being torsionally stressed as the levers and bread support are actuated toward the bread toasting position of the latter, and releasable means for retaining the support in its bread toasting position.

6. A toasting structure including electrical heating means for toasting a bread slice, a bread support movable relative to said heating means between a bread receiving position and a bread toasting position, a plurality of levers, a frame pivotally supporting said levers, means pivotally connecting at least a portion of said levers with said bread support for movement of the latter between its bread receiving and bread supporting positions, an elongated torsion bar having a portion thereof connected to a terminal portion of one of said levers in non-rotatable relation thereto with the bar extending normal to said one lever and providing a pivotal support for the latter, means securing a terminal portion of said torsion bar to said frame in non-rotatable relation thereto, said bar being torsionally stressed as the levers and bread support are actuated toward the bread toasting position of the latter, and releasable means for retaining the bread support in its bread toasting position.

7. A toasting structure including electrical heating means for toasting a bread slice, a bread support movable relative to said heating means between a bread receiving position and a bread toasting position, a plurality of levers, a frame pivotally supporting said levers, means pivotally connecting at least a portion of said levers with said bread support for movement of the latter between its bread receiving and bread supporting positions, an elongated torsion bar having an intermediate portion thereof connected to one of said levers in non-rotatable relation thereto, means restraining the terminal portions of said torsion bar against rotation relative to said frame, said bar being torsionally stressed as the levers and bread support are actuated toward the bread toasting position of the latter, and releasable means for retaining the bread support in its bread toasting position.

References Cited in the file of this patent

UNITED STATES PATENTS

| | | |
|---|---|---|
| 2,100,057 | Krebs | Nov. 23, 1937 |
| 2,555,697 | Lillyblad | June 5, 1951 |
| 2,692,549 | Olson | Oct. 26, 1954 |
| 2,750,876 | Visos | June 19, 1956 |